US012645249B2

(12) United States Patent
Rajan Kesavelu Shekar et al.

(10) Patent No.: US 12,645,249 B2
(45) Date of Patent: Jun. 2, 2026

(54) HUB DEVICE

(71) Applicant: NXP USA, Inc., Austin, TX (US)

(72) Inventors: Pramod Rajan Kesavelu Shekar, Bangalore (IN); Vasanth Mundargi, Bengaluru (IN)

(73) Assignee: NXP USA, Inc., Austin, TX (US)

( * ) Notice: Subject to any disclaimer, the term of this patent is extended or adjusted under 35 U.S.C. 154(b) by 68 days.

(21) Appl. No.: 18/639,275

(22) Filed: Apr. 18, 2024

(65) Prior Publication Data

US 2024/0361801 A1     Oct. 31, 2024

(30) Foreign Application Priority Data

Apr. 26, 2023    (IN)  ............................ 202311030043

(51) Int. Cl.
    G06F 1/10            (2006.01)
(52) U.S. Cl.
    CPC ..................................... G06F 1/10 (2013.01)
(58) Field of Classification Search
    CPC ..... G06F 1/10; G06F 13/4027; G06F 13/4291
    USPC ........................................................ 713/502
    See application file for complete search history.

(56) References Cited

U.S. PATENT DOCUMENTS

| | | | | |
|---|---|---|---|---|
| 7,089,338 B1 * | 8/2006 | Wooten | ............... | G06F 13/4291 |
| | | | | 710/48 |
| 7,162,654 B1 | 1/2007 | Price | | |
| 10,860,513 B1 * | 12/2020 | Cheung | ............... | G06F 13/4282 |
| 2004/0255070 A1 * | 12/2004 | Larson | ................ | G06F 13/4059 |
| | | | | 710/305 |
| 2018/0357199 A1 | 12/2018 | Mishra et al. | | |
| 2020/0004708 A1 * | 1/2020 | Zhou | ..................... | G06F 13/362 |
| 2024/0340250 A1 * | 10/2024 | Matthews | ........... | H04L 47/6255 |

FOREIGN PATENT DOCUMENTS

| | | |
|---|---|---|
| CN | 1371381 A1 | 2/2006 |
| CN | 115328826 A1 | 11/2022 |
| WO | WO-02097642 A1 | 12/2002 |

OTHER PUBLICATIONS

L Semiconductor: CANmodule-Iix; https://www.latticesemi.com/products/designsoftwareandip/intellectualproperty/ipcore/inicorecores/canmoduleiix; 3 pages Retrieved from the Internet on Aug. 25, 2025.

* cited by examiner

*Primary Examiner* — Brian T Misiura

(57) ABSTRACT

Embodiments herein relate to a hub device comprising: a first port, a second port and a hub controller. The first port is configured to be connected to an initiator controller. The second port is configured to be connected to a target device, and wherein the target device has an address. The hub controller is configured to receive the target device address from the initiator controller via the first port, and in response: set a first-port-clock-line of the first port to busy; transmit the received target device address to the second port, to which the target device is connected; enable a bridge between the initiator controller and the target device, via the first port and the second port; release the first-port-clock-line of the first port from busy; communicate an acknowledgement message from the target device to the initiator controller via the bridge; and communicate a data transmission between the initiator controller and the target device via the bridge.

15 Claims, 3 Drawing Sheets

```
                          ┌─────────┐
                          │  Start  │
                          └────┬────┘
                               │
                               ▼
        ┌──────────────────────────────────────────┐
        │ SMBUS Controller C1 Transmits T2 Address  │──── 330
        │                on Bus                      │
        └──────────────────────┬───────────────────┘
                               │
                               ▼
        ┌──────────────────────────────────────────┐
        │ Hub Checks for the Transmitted address by │──── 331
        │ C1, if it matches with List of Stored Address │
        └──────────────────────┬───────────────────┘
```

332                                                          333

| For Matched Target device address, SCL is made busy for Controller | Local 9CP Controller generates Clock and transmits address to T2 |

```
        ┌──────────────────────────────────────────┐
        │ Bridging is enabled between C1 and T2, SCL │──── 334
        │              busy is released              │
        └──────────────────────┬───────────────────┘
                               │
                               ▼
        ┌──────────────────────────────────────────┐
        │ C1 receives the ACK from T2 and Transmits │──── 335
        │                the Data                    │
        └──────────────────────┬───────────────────┘
                               │
                               ▼
        ┌──────────────────────────────────────────┐
        │ After completion of Data Transmission,    │──── 336
        │       Enabled bridge is disabled          │
        └──────────────────────┬───────────────────┘
                               │
                               ▼
                          ┌─────────┐
                          │  Stop   │
                          └─────────┘
```

Figure 4

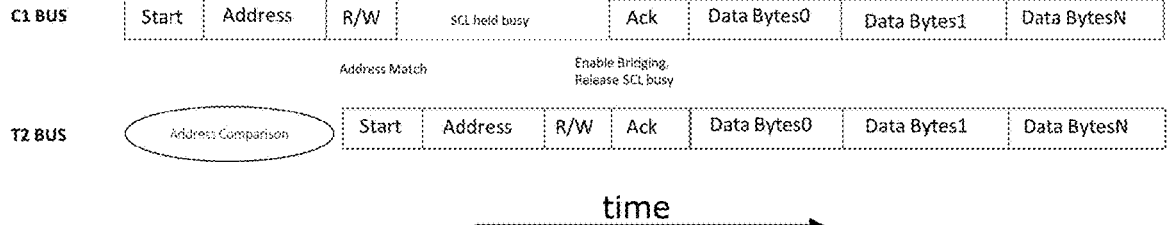

HUB DEVICE

CROSS-REFERENCE TO RELATED APPLICATIONS

This application claims priority under 35 U.S.C. § 119 to Indian provisional patent application number 202311030043, filed Apr. 26, 2023, the contents of which are incorporated by reference herein.

FIELD

The present disclosure relates to a hub device, and a method of operating a hub device, that can enable a bridge between an initiator controller and a target device for communicating a data transaction.

SUMMARY

According to a first aspect of the present disclosure there is provided a hub device comprising:

a first port, which includes a first-port-clock-line and a first-port-data-line, wherein the first port is configured to be connected to an initiator controller;

a second port, which includes a second-port-clock-line and a second-port-data-line, wherein the second port is configured to be connected to a target device, and wherein the target device has an address; and a hub controller;

wherein, the hub controller is configured to receive the target device address from the initiator controller via the first port, and in response:

set the first-port-clock-line of the first port to busy;

transmit the received target device address to the second port, to which the target device is connected;

enable a bridge between the initiator controller and the target device, via the first port and the second port;

release the first-port-clock-line of the first port from busy;

communicate an acknowledgement message from the target device to the initiator controller via the bridge; and communicate a data transmission between the initiator controller and the target device via the bridge.

Advantageously, such a hub device can enable a bus connection between the initiator controller and the target device (that are on different ports) without host involvement thereby providing for a quick and seamless data transaction.

In one or more embodiments, the hub controller is further configured to:

transmit the received target device address to the second port for a predetermined number of clock cycles.

In one or more embodiments, the hub controller is further configured to:

set the first-port-clock-line of the first port to busy for the predetermined number of clock cycles, at the same time as transmitting the received address of the target device to the second port.

In one or more embodiments, predetermined number of clock cycles is nine.

In one or more embodiments:

the bridge comprises a bridge-clock-line and a data-clock-line;

the bridge-clock-line connects the first-port-clock-line to the second-port-clock-line; and the data-clock-line connects the first-port-data-line to the second-port-data-line.

In one or more embodiments, the hub controller is further configured to:

communicate a clock signal from the initiator controller to the target device via the bridge-clock-line.

In one or more embodiments, the hub controller is further configured to:

after completion of the data transmission, disable the bridge.

In one or more embodiments:

the hub device further comprises computer memory that stores a list of connected target device addresses; and the hub controller is further configured to, in response to receiving the target device address from the initiator controller via the first port:

inspect the computer memory to determine whether or not the received target device address is stored as a connected target device address; and (only) if the computer memory does include the received target device address, then continue as set out above.

In one or more embodiments, the hub device further includes:

a first IO block that is configured to perform voltage transformation of signalling as it passes through the first port between a voltage domain that is associated with devices that are connected to the first port and a voltage domain that is associated with the hub device; and/or a second IO block that is configured to perform voltage transformation of signalling as is passes through the second port between a voltage domain that is associated with devices that are connected to the second port and the voltage domain that is associated with the hub device.

In one or more embodiments, the voltage domain of devices that are connected to the first port is different to the voltage domain of devices that are connected to the second port.

According to a further aspect of the present disclosure, there is provided a method of operating a hub device for communicating a data transmission between an initiator controller and a target device, wherein the method comprises:

receiving a target device address from an initiator controller via a first port of the hub device, and in response:

setting a first-port-clock-line of the first port to busy;

transmitting the received target device address to a second port of the hub device, to which the target device is connected;

enabling a bridge between the initiator controller and the target device, via the first port and the second port;

releasing the first-port-clock-line of the first port from busy;

communicating an acknowledgement message from the target device to the initiator controller via the bridge; and communicating the data transmission between the initiator controller and the target device via the bridge.

In one or more embodiments, the method further comprises:

transmitting the received target device address to the second port for a predetermined number of clock cycles.

In one or more embodiments, the method further comprises:

setting the first-port-clock-line of the first port to busy for the predetermined number of clock cycles, at the same time as transmitting the received address of the target device to the second port.

In one or more embodiments, the predetermined number of clock cycles is nine.

According to a further aspect of the present disclosure, there is provided a computer program configured to perform any of the methods disclosed herein.

While the disclosure is amenable to various modifications and alternative forms, specifics thereof have been shown by way of example in the drawings and will be described in detail. It should be understood, however, that other embodiments, beyond the particular embodiments described, are possible as well. All modifications, equivalents, and alternative embodiments falling within the spirit and scope of the appended claims are covered as well.

The above discussion is not intended to represent every example embodiment or every implementation within the scope of the current or future Claim sets. The figures and Detailed Description that follow also exemplify various example embodiments. Various example embodiments may be more completely understood in consideration of the following Detailed Description in connection with the accompanying Drawings.

BRIEF DESCRIPTION OF THE DRAWINGS

One or more embodiments will now be described by way of example only with reference to the accompanying drawings in which:

FIG. 2 shows an example embodiment of a hub device according to the present disclosure;

FIG. 3 illustrates an example embodiment of a method of operating a hub device according to the present disclosure; and FIG. 4 shows a timing diagram representation of data flow for a hub device according to the present disclosure.

DETAILED DESCRIPTION

Figure 1:
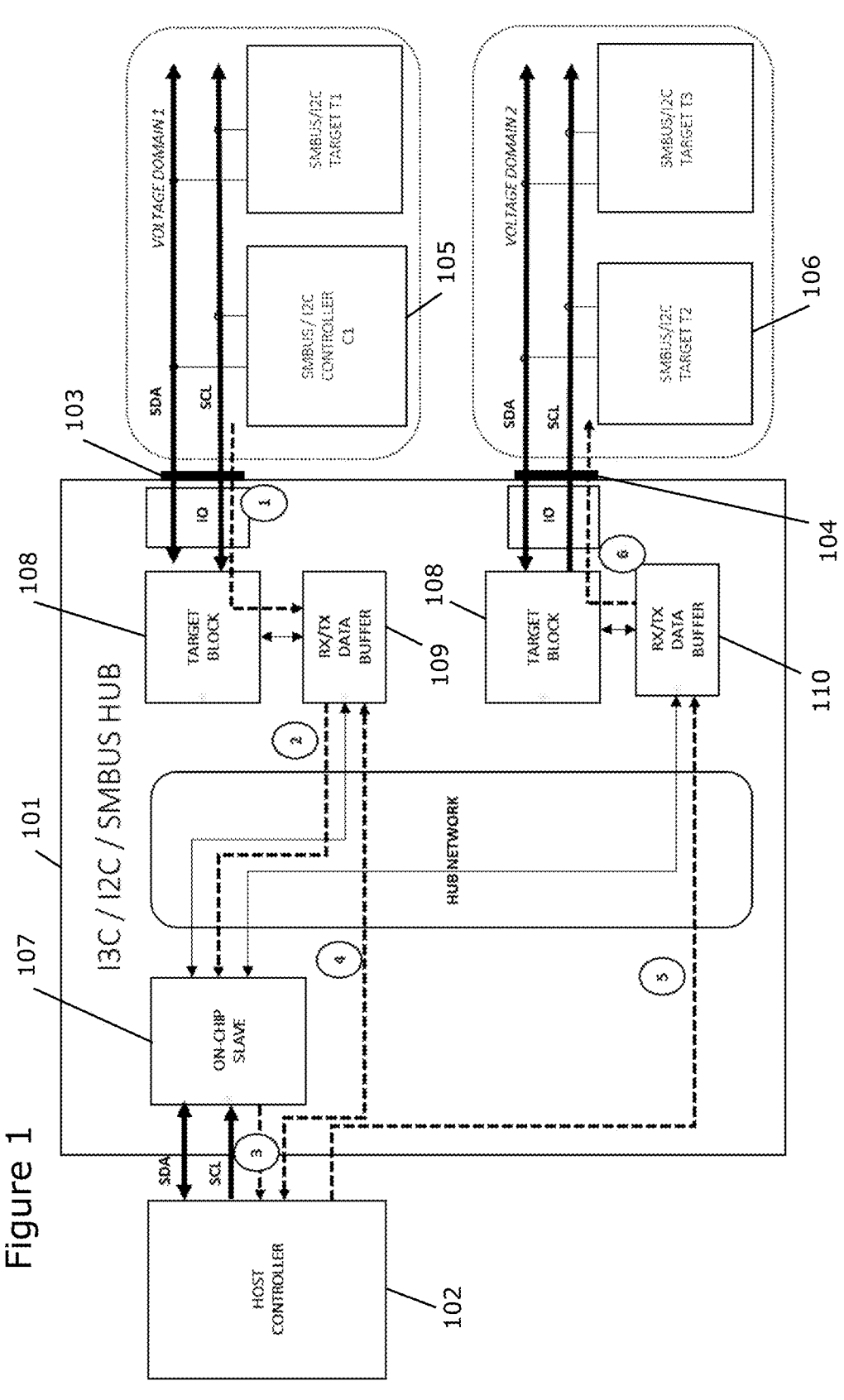
FIG. 1 shows a schematic illustration of a hub device.

FIG. 1 shows a schematic illustration of a hub device 101. The hub device can provide a bridge between a host controller 102 and multiple target devices that are connected to different ports of the hub device. In FIG. 1: an initiator controller, C1, 105 is shown connected to a first port 103; and a target device, T2, 106 is shown connected to a second port 104. We will describe below how the host controller 102 manages a data transmission between the initiator controller, C1, 105 and the target device, T2, 106.

The hub device 101 can also achieve bus capacitance isolation by splitting the load of the bus onto multiple target ports (such as the first port 103 and the second port 104), thereby allowing port expansion across the controller and target devices.

In FIG. 1, the hub device 101 consists of an on-chip slave 107 for interacting with the host controller 102. A target block 108 in the hub device 101, includes a target device and a target agent (not shown) for each port for interacting with the corresponding target port devices.

We will now describe how the initiator controller, C1, 105 starts a data transmission with the target device, T2, 106.

As a first step (identified as step (1) in FIG. 1), the initiator controller, C1, 105 transmits to its associated target block 108 the address of the target device, T2, 106 and the data bytes that are to be transmitted to the target device, T2, 106.

The target device, T2, 106 can also be referred to as a recipient device. The target block 108 stores the address and the data bytes in a dedicated local Rx data buffer 109 in the hub device 101.

After the transmission is complete, the on-chip target block 108 in the hub device 101 sends out an in-band-interrupt (IBI) to the host controller 102 along with status data. In this way, the status of the data received is triggered to the on-chip slave 107. This functionality is identified as step (2) in FIG. 1. The on-chip slave 107 triggers an In-Band Interrupt/Interrupt to the host controller 102 with Interrupt Status. This functionality is identified as step (3) in FIG. 1. The transmission can be considered to be complete when the Rx data buffer 109 is full. In one example application, the Rx data buffer 109 can be 80 bytes, which can be considered as a large amount of data for this type of application. Therefore, waiting for the RX data buffer 109 to become full can represent a significant time delay in the data transmission.

The host controller 102, responding to the IBI, reads the contents of the RX data buffer 109 and writes the data into a transmit buffer 110 of the corresponding target port 104 to which the target device, T2, 106 is connected. Step (4) in FIG. 1 shows the host controller 102 reading the data from the Rx data buffer 109. Step (5) in FIG. 1 shows the host controller 102 writing the data on to the corresponding Tx Data Buffer 110 on a different target port for the target device, T2, 106.

After the write is complete, the corresponding target block/agent 108 is triggered to send the data from the transmit data buffer 110 to the recipient target device, T2, 106. This functionality is identified as step (6) in FIG. 1.

Steps (1) to (6) as they are labelled in FIG. 1 illustrate a detailed data transaction flow between the initiator controller, C1, 105 (that is connected to a first port) 103) and a target device, T2, 106 that is connected to a different port 104 of the hub device 101. Such a transaction flow is a complicated process. Also, as identified above, the transaction flow can require a long cycle time to complete the transaction due to delays that are caused by writing to and reading from buffers that are inherent in the process flow.

In contrast, in one or more of the examples disclosed below, data communication between an initiator controller, C1, and a target device, T2, can be enabled without a host controller's involvement. In this way, there can be a seamless data transaction between an initiator controller and target controllers/devices on different ports.

Figure 2:
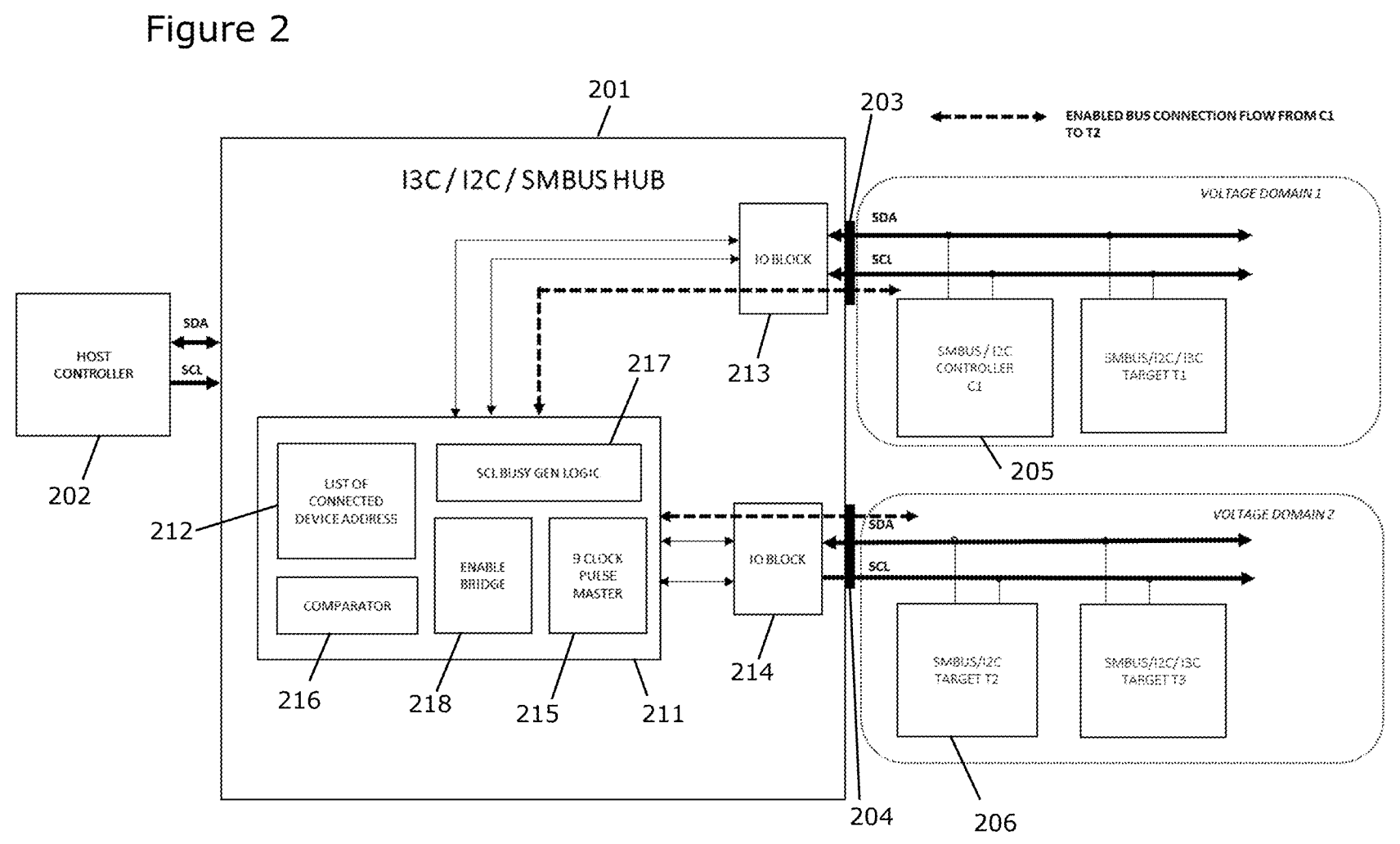

FIG. 2 shows an example embodiment of a hub device 201 according to the present disclosure. The hub device 201 includes a hub controller 211.

The hub device 201 has a first port 203 and a second port 204. In the same way that is described with reference to FIG. 1, the first port 203 is connected to an initiator controller, C1, 205 and the second port 204 is connected to a target device, T2, 206. As is known in the art the target device, T2, 206 has a target device address.

The first port 203 includes a first-port-clock-line, SCL, and a first-port-data-line, SDL. The initiator controller, C1, 205 has corresponding clock ports and data ports that are respectively connected to the first-port-clock-line, SCL, and the first-port-data-line, SDL, of the first port 203.

The second port 204 also includes a second-port-clock-line, SCL, and a second-port-data-line, SDL. The target device, T2, 206 has corresponding clock ports and data ports that are respectively connected to the second-port-clock-line, SCL, and the second-port-data-line, SDL, of the second port 204.

We will now describe an example in which the initiator controller, C1, 205 (that is connected to the first port 203) intends to communicate with the target device, T2, 206 (that is connected to the second port 204). The initiator controller, C1, 205 transmits the recipient device's address (in this example the address of the target device, T2, 206) to the hub device 201. The hub controller 211 therefore receives the target device address from the initiator controller, C1, 205 via the first port 203.

In response to receiving the address of the target device, T2, 206 from the initiator controller, C1, 205, the hub controller 211 takes the following actions:

i. it sets the first-port-clock-line of the first port 203 to busy. In this way, the hub device 201 holds the SCL line busy before sending out an acknowledgement message (as will be discussed below).

ii. it transmits the address of the target device, T2, 206 to the second port 204 so that the target device, T2, 206 is informed that it is to be communicated with. In this example, the hub controller 211 transmits the address of the target device, T2, 206 over 9 clock pulses, although it will be appreciated that any other predetermined number of clock cycles can be used. In this way, the hub controller 211 sends out clock pulses to the target device, T2, 206 via the second-port-clock-line to briefly mimic the initiator controller, C1, 205. At the same time, the hub controller 211 sends out the target device address to the target device, T2, 206 via the second-port-data-line such that the target device, T2, 206 receives that signal on its data line.

This transmission of data and clock pulses to the target device, T2, 206 is performed while the first-port-clock-line of the first port 203 is set to busy (identified as step i. above). In this, way the hub controller 211 can also set the first-port-clock-line of the first port 203 to busy for the same predetermined number of clock cycles as are used to transmit the address of the target device, T2, 206 to the second port (to which it is connected).

iii. it enables a bridge between the initiator controller, C1, 205 and the target device, T2, 206 via the first port 203 and the second port 204.

iv. it releases the first-port-clock-line of the first port 203 from busy. In this way, the SCL line that is connected to the initiator controller, C1, 205, which was held busy, is released. This enables transparency between the initiator controller, C1, 205 and the target device, T2, 206 such that seamless data communication between the initiator controller, C1, 205 and the target device, T2, 206 can be performed. Importantly, such communication does not require the involvement of the host controller 202 in the same way that is described with reference to FIG. 1.

v. it communicates an acknowledgement message from the target device, T2, 206 to the initiator controller, C1, 205 via the bridge. Therefore, the initiator controller, C1, 205 is informed that the target device, T2, is ready to receive a data transmission.

vi. it communicates a data transmission between the initiator controller, C1, and the target device, T2, via the bridge. In this way, the hub controller 211 performs a data transaction on the enabled bridge with the target device/controller, T2 206 that is on a different port to the initiator controller, C1, 205. This data transaction is illustrated schematically in FIG. 2 with dashed lines.

vii. after completion of the data transmission, it disables the bridge. In this way, after the communication is done and the transaction is complete, the bridge is disabled to bring the hub device 201 it back to its original state.

Advantageously, enabling a bus connection between the initiator controller, C1, 205 and the target device, T2, 206 (that are on different ports) without host involvement provides for a seamless data transaction. The data transaction can be performed more quickly than is possible with the hub device of FIG. 1 because it is not necessary to store that data in a buffer before the host controller initiates the transfer of data to the target device, T2, 206.

In this example, the bridge includes a bridge-clock-line and a data-clock-line. The bridge-clock-line connects the first-port-clock-line (SCL of the first port 203) to the second-port-clock-line (SCL of the second port 204). The data-clock-line connects the first-port-data-line (SDA of the first port 203) to the second-port-data-line (SDA of the second port 204). The initiator controller, C1, 205 can provide a clock signal to the target device, T2, 206 via the bridge-clock-line. In this way, the hub controller 211 communicates a clock signal from the initiator controller, C1, 205 to the target device, T2, 206 via the bridge-clock-line. This can be beneficial because it avoids the need for a different entity (such as the host controller 202) to provide a clock signal for facilitating the data transfer between the initiator controller, C1, 205 and the target device, T2, 206.

Devices that are connected to the first port 203 can operate in a first voltage domain. Devices that are connected to the second port 204 can operate in a second voltage domain, which is different to the first voltage domain. The hub device 201 enables voltage level compatibility between the host controller 211 and devices that are connected to the first port 203 and the second port 204.

In FIG. 2, the hub device 201 includes a first IO block 213 and a second IO block 214. The first IO block 213 performs voltage transformation of signalling as it passes through the first port 203 between a voltage domain that is associated with devices that are connected to the first port 203 and a voltage domain that is associated with the hub device 201. The second IO block 214 performs voltage transformation of signalling as is passes through the second port 204 between a voltage domain that is associated with devices that are connected to the second port 204 and the voltage domain that is associated with the hub device 201.

In the example of FIG. 2, the hub device 201 also includes computer memory 212 that stores a list of connected target device addresses. In response to receiving the target device address from the initiator controller, C1, 205 via the first port 203, the hub controller 211 can perform the following steps before steps i. to vii. that are discussed above.

The hub controller 211 inspects the computer memory 212 to determine whether or not it includes the received target device address. If the computer memory 212 does include the received target device address, then the hub controller 211 continues with steps i. to vii. If the computer memory 212 does not include the received target device address, then the hub controller 211 stops and it does not continue with steps i. to vii. In this way, the received address of the target device, T2, 206 is compared with the list of connected targeted devices on any of the ports of the hub device 201. If the received target device address matches one that is known to be connected to the hub device 201, then the requested data transaction can be performed.

FIG. 3 illustrates an example embodiment of a method of operating a hub device according to the present disclosure. The hub device can have one or more of the features that are illustrated in FIG. 2. The hub device is connected to an initiator controller and to a target device, on different ports of the hub device. The initiator controller/device intends to communicate with the target controller/device.

FIG. 4 shows a timing diagram representation of the data flow: between the initiator controller and the hub controller (the upper timing diagram, labelled as C1 BUS); and between the target device and the hub controller (the lower timing diagram, labelled as T2 BUS).

Returning to FIG. 3, at step 330, the initiator controller transmits the address of the target device it intends to communicate with to the hub device. In this example, the address is communicated over a system management bus (SMBUS).

At step 331, the hub device compares the received target device address with a list of target device addresses that are connected to a port of the hub device. It can do this by checking if the received target device address matches a list of addresses that are stored in computer memory. If there is a match, then the method continues as shown in FIG. 3 on the basis that the recipient target device is connected to a port of the hub device. If there is no match, then the method ends.

Steps 332 and 333 are shown in parallel in FIG. 3 because they are performed at the same time, as can also be seen from the timing diagram of FIG. 4. At step 332, the SCL line is held busy for the initiator controller/device. At step 333, the hub controller sends out 9 clock pulses on the port (P2) to which the target device is connected, along with the address of the target device. As indicated above, in other examples a different number of clock pulses can be used. For example, any number that is greater than one, greater than two, greater than five, etc. can be used. The number of clock signals that is used can be any number that is consistent with a communication protocol that is being used.

At step 334, the hub controller enables a bridge/tunnel between the port (P1) to which the initiator controller is connected and the port (P2) to which the target device is connected. The SCL line for the initiator controller/device (that was previously held busy) is then released. The target device can then send out an acknowledge (ACK) to the initiator controller.

At step 335, the initiator controller receives the ACK from the target device and transmits data to the target device. In this way, the initiator controller can start communicating with the target device via the bridge that has been formed between their associated ports (P1 and P2).

At step 336, after completion of the data transmission, the enabled bridge is disabled. In this way, the bridge is terminated after the packet transfer is complete.

Returning to FIG. 2, the hub device 201 can include any of the following functional blocks for performing the functionality of the hub device that is described herein.

9CP Master 215: 9 Clock Pulse Master; this block can mimic the initiator controller, C1, 205 to generate 9 clock pulses.

List of Connected Devices Address 212: this block stores the list of target device addresses connected to the hub device on different ports, along with an indication of which port the target device address is associated with.

Comparator 216: this block compares the received target device address from the initiator controller to check if the address matches to any of the target device addresses connected on a different port from the "List of connected Devices Address" 212. In one example, the target device address can be provided as the first 8 bytes of data in a data packet.

SCL Busy Generator 217: this unit generates the SCL Busy, i.e., it pulls the SCL line to the initiator controller port low to indicate busy/wait. This can be referred to as clock stretching, which is used to keep the initiator controller on hold.

Enable Bridge 218: this block enables the bridge between the initiator controller and target ports for data communication for the matching target device address.

One or more of the hub devices described herein can:

enable data transfer from a controller device on one port to a target device connected on another port without an intervention from the host controller.

avoid the need for any host controller involvement. The host controller is therefore not disturbed and can continue with its tasks.

reduce latency between controller and target devices.

avoid the need for storing the data that is to be transferred locally in local buffer storage.

The hub devices described herein can be provided on hub network based chips (integrated circuits). They can achieve quick communication between Controller and Target Devices on different ports at different voltages.

The instructions and/or flowchart steps in the above figures can be executed in any order, unless a specific order is explicitly stated. Also, those skilled in the art will recognize that while one example set of instructions/method has been discussed, the material in this specification can be combined in a variety of ways to yield other examples as well, and are to be understood within a context provided by this detailed description.

In some example embodiments the set of instructions/method steps described above are implemented as functional and software instructions embodied as a set of executable instructions which are effected on a computer or machine which is programmed with and controlled by said executable instructions. Such instructions are loaded for execution on a processor (such as one or more CPUs). The term processor includes microprocessors, microcontrollers, processor modules or subsystems (including one or more microprocessors or microcontrollers), or other control or computing devices. A processor can refer to a single component or to plural components.

In other examples, the set of instructions/methods illustrated herein and data and instructions associated therewith are stored in respective storage devices, which are implemented as one or more non-transient machine or computer-readable or computer-usable storage media or mediums. Such computer-readable or computer usable storage medium or media is (are) considered to be part of an article (or article of manufacture). An article or article of manufacture can refer to any manufactured single component or multiple components. The non-transient machine or computer usable media or mediums as defined herein excludes signals, but such media or mediums may be capable of receiving and processing information from signals and/or other transient mediums.

Example embodiments of the material discussed in this specification can be implemented in whole or in part through network, computer, or data based devices and/or services. These may include cloud, internet, intranet, mobile, desktop, processor, look-up table, microcontroller, consumer equipment, infrastructure, or other enabling devices and services. As may be used herein and in the claims, the following non-exclusive definitions are provided.

In one example, one or more instructions or steps discussed herein are automated. The terms automated or automatically (and like variations thereof) mean controlled operation of an apparatus, system, and/or process using computers and/or mechanical/electrical devices without the necessity of human intervention, observation, effort and/or decision.

It will be appreciated that any components said to be coupled may be coupled or connected either directly or indirectly. In the case of indirect coupling, additional components may be located between the two components that are said to be coupled.

In this specification, example embodiments have been presented in terms of a selected set of details. However, a person of ordinary skill in the art would understand that many other example embodiments may be practiced which include a different selected set of these details. It is intended that the following claims cover all possible example embodiments.

The invention claimed is:

1. A hub device comprising:
a first port, which includes a first-port-clock-line and a first-port-data-line, wherein the first port is connected to an initiator controller;
a second port, which includes a second-port-clock-line and a second-port-data-line, wherein the second port is connected to a target device, and wherein the target device has an address; and
a hub controller;
wherein, the hub controller is configured to receive the address from the initiator controller via the first port, and in response:
set the first-port-clock-line of the first port to busy;
transmit the received target device-address to the second port;
enable a bridge between the initiator controller and the target device, via the first port and the second port;
release the first-port-clock-line of the first port from busy;
communicate an acknowledgement message from the target device to the initiator controller via the bridge; and
communicate a data transmission between the initiator controller and the target device via the bridge.

2. The hub device of claim 1, wherein the hub controller is further configured to:
transmit the received address to the second port for a predetermined number of clock cycles.

3. The hub device of claim 2, wherein the hub controller is further configured to:
set the first-port-clock-line of the first port to busy for the predetermined number of clock cycles, concurrently with transmitting the received address of the target device to the second port.

4. The hub device of claim 2, wherein the predetermined number of clock cycles is nine.

5. The hub device of claim 1, wherein:
the bridge comprises a bridge-clock-line and a data-clock-line;
the bridge-clock-line connects the first-port-clock-line to the second-port-clock-line; and
the data-clock-line connects the first-port-data-line to the second-port-data-line.

6. The hub device of claim 5, wherein the hub controller is further configured to:
communicate a clock signal from the initiator controller to the target device via the bridge-clock-line.

7. The hub device of claim 1, wherein the hub controller is further configured to:
after completion of the data transmission, disable the bridge.

8. The hub device of claim 1, wherein:
the hub device further comprises computer memory that stores a list of connected target device addresses; and
the hub controller is further configured to, in response to receiving the address from the initiator controller via the first port:
inspect the computer memory to determine whether or not the received address is stored in the list of connected target device addresses.

9. The hub device of claim 1, wherein the hub device further includes:
a first IO block that is configured to perform voltage transformation of signalling as it passes through the first port between a voltage domain that is associated with devices that are connected to the first port and a voltage domain that is associated with the hub device; and
a second IO block that is configured to perform voltage transformation of signalling as it passes through the second port between a voltage domain that is associated with devices that are connected to the second port and the voltage domain that is associated with the hub device.

10. The hub device of claim 9, wherein the voltage domain of devices that are connected to the first port is different to the voltage domain of devices that are connected to the second port.

11. A method of operating a hub device for communicating a data transmission between an initiator controller and a target device, wherein the method comprises:
receiving a target device address from an initiator controller via a first port of the hub device, and in response:
setting a first-port-clock-line of the first port to busy;
transmitting the received target device address to a second port of the hub device, to which the target device is connected;
enabling a bridge between the initiator controller and the target device, via the first port and the second port;
releasing the first-port-clock-line of the first port from busy;
communicating an acknowledgement message from the target device to the initiator controller via the bridge; and
communicating the data transmission between the initiator controller and the target device via the bridge.

12. The method of claim 11, further comprising:
transmitting the received target device address to the second port for a predetermined number of clock cycles.

13. The method of claim 12, further comprising:
setting the first-port-clock-line of the first port to busy for the predetermined number of clock cycles, concurrently with transmitting the received target device address to the second port.

14. The method of claim 12, wherein the predetermined number of clock cycles is nine.

15. A non-transitory computer-readable medium embodying a set of executable instructions to manipulate a processor to perform a method of operating a hub device for communicating a data transmission between an initiator controller and a target device, wherein the method comprises:
receiving a target device address from an initiator controller via a first port of the hub device, and in response:
setting a first-port-clock-line of the first port to busy;
transmitting the received target device address to a second port of the hub device, to which the target device is connected;

enabling a bridge between the initiator controller and the target device, via the first port and the second port;

releasing the first-port-clock-line of the first port from busy;

communicating an acknowledgement message from the target device to the initiator controller via the bridge; and communicating the data transmission between the initiator controller and the target device via the bridge.

* * * * *